United States Patent
Uitto et al.

(10) Patent No.: US 9,350,740 B1
(45) Date of Patent: May 24, 2016

(54) METHOD, SYSTEM AND APPARATUS FOR NETWORK MANAGEMENT BASED ON BUSINESS RELATIONSHIP INFORMATION

(71) Applicant: Jakamo Oy, Seinajoki (FI)

(72) Inventors: Anssi Uitto, Seinajoki (FI); Jarl Matti Anttila, Seinajoki (FI); Matti Makela, Tampere (FI); Tommi Ranta, Seinajoki (FI); Timo Rossi, Vaasa (FI); Jukka Vesalainen, Vaasa (FI)

(73) Assignee: Jakamo Oy, Seinajoki (FI)

( * ) Notice: Subject to any disclaimer, the term of this patent is extended or adjusted under 35 U.S.C. 154(b) by 0 days.

(21) Appl. No.: 14/531,134

(22) Filed: Nov. 3, 2014

(51) Int. Cl.
  *G06F 7/00* (2006.01)
  *H04L 29/06* (2006.01)
  *H04L 12/911* (2013.01)

(52) U.S. Cl.
  CPC ............ *H04L 63/101* (2013.01); *H04L 47/70* (2013.01)

(58) Field of Classification Search
  USPC ............... 235/376, 379, 380; 705/7.12, 7.13
  See application file for complete search history.

(56) References Cited

U.S. PATENT DOCUMENTS

| | | | |
|---|---|---|---|
| 8,117,052 B2* | 2/2012 | Chung | G06Q 10/063 705/7.11 |
| 2003/0083912 A1* | 5/2003 | Covington, III | G06Q 10/0631 705/7.12 |
| 2004/0059611 A1* | 3/2004 | Kananghinis | G06Q 10/06 705/325 |
| 2008/0109343 A1* | 5/2008 | Robinson | G06Q 40/04 705/37 |
| 2011/0112880 A1* | 5/2011 | Ryan | G06Q 10/06 705/7.16 |

* cited by examiner

*Primary Examiner* — Ahshik Kim
(74) *Attorney, Agent, or Firm* — Ziegler IP Law Group, LLC (57) ABSTRACT

A method for providing a dynamic business network and data management service system includes defining an account for a co-operation organization for accessing the dynamic business network and data network management service system. At least one co-operation organization is defined having at least one co-operation relation, wherein the co-operation relation is associated with at least two accounts. Business relationship information is defined based on the co-operation relation. The business relationship information is maintained in a system server, wherein the business relationship information has inbound information and outbound information associated to the at least two accounts. A set of context centric applications is provided accessible for the at least two accounts over a network and configured to operate on the business relationship information associated to the at least two accounts. Each context centric application is configured to generate at least one data entity and dynamically share the at least one data entity using at least one context centric application for the at least two accounts.

20 Claims, 5 Drawing Sheets

METHOD, SYSTEM AND APPARATUS FOR NETWORK MANAGEMENT BASED ON BUSINESS RELATIONSHIP INFORMATION

TECHNICAL FIELD

The present disclosure generally relates to a dynamic business network and data management service system. The present disclosure relates more particularly, though not exclusively, to providing tools and interfaces for accessing the dynamic business network and data management service system, managing data entities in the system, accounts, data flow between users, and the networking between the accounts.

BACKGROUND ART

A variety of cloud based services provided for different kinds of client organization processes is increasing. At the same time the information management of the dynamic business networks, including tasks and dependencies with time constraints become more difficult. For example, in manufacturing industry a trend for outsourcing and focusing on core competencies has evolved complex networked value chains.

Traditional information systems (like enterprise resource planning systems and product data management systems) are hence developing additional features (portals, extranets, working spaces etc.) to match the needs of this networked economy. This however creates a vast variety of hierarchical (every company has their own different systems) co-operation systems with scattered information and lack of transparency.

Currently co-operation tools provide different kinds of tools for individuals to create and provide input data to various systems.

However, current co-operation and information sharing systems are typically serving only a main company and service information is distributed downwards in hierarchy. From supplier's point of view this means that the shared information is scattered to different systems (e.g. different extranets, portals, working spaces which different customers use and they have to sign in). Another drawback of existing systems is the distinction of information shared to you (in customers' sharing systems like their portals and extranets) and information shared by you (in your sharing systems) that causes separate working spaces for information management with no combining view for all shared information in different business relations (customers, suppliers, units from same group and other partners).

Thus, there is a need for a dynamic business network and data management service system for a company as a center of its own network and information attached to its business relationships.

SUMMARY

According to a first aspect of the disclosed embodiments there is provided a method for providing a dynamic business network and data management service system, the method comprising:
  defining an account for a co-operation organization for accessing the dynamic business network and data network management service system;
  defining at least one co-operation organization comprising at least one co-operation relation, wherein the co-operation relation being associated with at least two accounts;
  defining business relationship information based on the co-operation relation;
  maintaining the business relationship information in a system server, wherein the business relationship information comprising inbound information and outbound information associated to the at least two accounts;
  providing a set of context centric applications accessible for the at least two accounts over a network and configured to operate on the business relationship information associated to the at least two accounts, wherein each context centric application configured to generate at least one data entity; and
  dynamically sharing the at least one data entity using at least one context centric application for the at least two accounts.

In an embodiment, the account comprises at least one of a group account reflecting a business group, and a sub-account reflecting a company belonging to the business group, and the method further comprising:
  inviting, by the group account, at least one sub-account to associate the sub-accounts with the group account.

In an embodiment, the account for a co-operation organization for accessing the dynamic network management service system comprising a group of sub-accounts, the sub-accounts reflecting companies belonging to same group represented by the account.

In an embodiment, the method further comprises:
  dynamically sharing a data entity of a sub-account with the group account and providing a group view for the group account showing data entities from multiple sub-accounts.

In an embodiment, the method further comprises:
  dynamically sharing a plurality of data entities for the at least two accounts by providing a list of the data entities and the dynamically shared data entities being selected based on the list.

In an embodiment, the method further comprises:
  defining access rights for the account, based on which access rights a user of the account is provided access to the dynamic network management service system.

In an embodiment, the access rights for the account define access rights for data entities accessible for the account using context centric applications.

In an embodiment, the method further comprises:
  defining, by an account responsible for a data entity, the access rights of another account for the data entity.

In an embodiment, the data entity comprises at least one of the following:
  development action related information;
  suggested idea information;
  claim information;
  bill information;
  task information;
  discussions information;
  schedule information;
  status information;
  reports information;
  order information;
  offer request information;
  offer information;
  contract information;
  project information;
  audit information; and
  product information.

In an embodiment, the method further comprises:
  providing an access for the account over a web based service to the dynamic business network and data network management service system.

In an embodiment, the method further comprises:

providing user interaction for the web based service with a browser-based application.

According to a second aspect of the disclosed embodiments there is provided an apparatus comprising:
- a communication unit configured to provide access to a user device;
- a processor;
- a memory including computer program code;
- the memory and the computer program code configured to, with the processor, cause the apparatus to:
  - define an account for a co-operation organization for accessing the dynamic business network and data network management service system;
  - define at least one co-operation organization comprising at least one co-operation relation, wherein the co-operation relation being associated with at least two accounts;
  - define business relationship information based on the co-operation relation;
  - maintain the business relationship information in a system server, wherein the business relationship information comprising inbound information and outbound information associated to the at least two accounts;
  - provide a set of context centric applications accessible for the at least two accounts over a network and configured to operate on the business relationship information associated to the at least two accounts, wherein each context centric application configured to generate at least one data entity; and
  - dynamically share the at least one data entity using at least one context centric application for the at least two accounts.

In an embodiment, the apparatus comprises a server apparatus connected via the communication unit to Internet and configured to provide access to a plurality of user devices, and the server apparatus further comprising:
- a global database;
- a user database;
- an index database;
- a cached information database; wherein
- the memory and the computer program code configured to, with the processor, cause the server apparatus to:
  - provide dynamic business network and data management service system related data, by the global database, available to the plurality of user devices;
  - provide dedicated user data, by the user database, data that being available only to a dedicated user of users operating the plurality of user devices;
  - provide searchable information, by the index database, available to a service system; and
  - provide cached information, by the cached information database, available to the plurality of user devices.

In an embodiment, the dynamic business network and data management service system related data comprises at least one of the following: public data, public timelines, public data entities, and public work objects; and
the dedicated user data comprising at least one of the following: private user data, private user timelines, private user data entities, user work objects, collaborators and user profile information.

In an embodiment, the searchable information comprising organized information ready for searching and retrieval by extracting key words; and the cached information comprising copies of content that the service system locates and makes available to the plurality of user devices.

In an embodiment, history data of the dynamic business network and data management service system is stored to the cached information.

In an embodiment, the apparatus comprises a network level information platform (NIP).

In an embodiment, the network level information platform (NIP) comprising:
- a plurality of context centric applications configured to operate on information associated to at least two accounts of companies, wherein each context centric application is configured to generate at least one data entity and dynamically sharing the at least one data entity using at least one context centric application for the at least two accounts.

In an embodiment, the network level information platform (NIP) further comprising:
- an application programming interface (API) for automatically transceiving information relating to at least one data entity.

In an embodiment, the data entity comprising an order from an ERP system external to the network level information platform (NIP).

According to a third aspect of the disclosed embodiments there is provided a computer program embodied on a computer readable medium comprising computer executable program code which, when executed by at least one processor of an apparatus, causes the apparatus to:
- define an account for a co-operation organization for accessing the dynamic business network and data network management service system;
- define at least one co-operation organization comprising at least one co-operation relation, wherein the co-operation relation being associated with at least two accounts;
- define business relationship information based on the co-operation relation;
- maintain the business relationship information in a system server, wherein the business relationship information comprising inbound information and outbound information associated to the at least two accounts;
- provide a set of context centric applications accessible for the at least two accounts over a network and configured to operate on the business relationship information associated to the at least two accounts, wherein each context centric application configured to generate at least one data entity; and
- dynamically share the at least one data entity using at least one context centric application for the at least two accounts.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present disclosure have been illustrated in the foregoing. The above embodiments are used merely to explain selected aspects or steps that may be utilized in implementations of the aspects of the disclosed embodiments. Some embodiments may be presented only with reference to certain aspects of the present disclosure. It should be appreciated that corresponding embodiments may apply to other aspects as well.

BRIEF DESCRIPTION OF THE DRAWINGS

The aspects of the disclosed embodiments will be described, by way of example only, with reference to the accompanying drawings, in which.

DETAILED DESCRIPTION

In the following description, like numbers denote like elements. The systems and techniques described here relate to dynamic business network management and dynamic information management.

Technology has been developed to help in providing dynamic business network management and dynamic information management and tools for it. Typical challenges comprise, for example, management of networked projects, providing transparency in the projects, delegating responsibility within the project team and providing online feedback of the project status.

Figure 1:
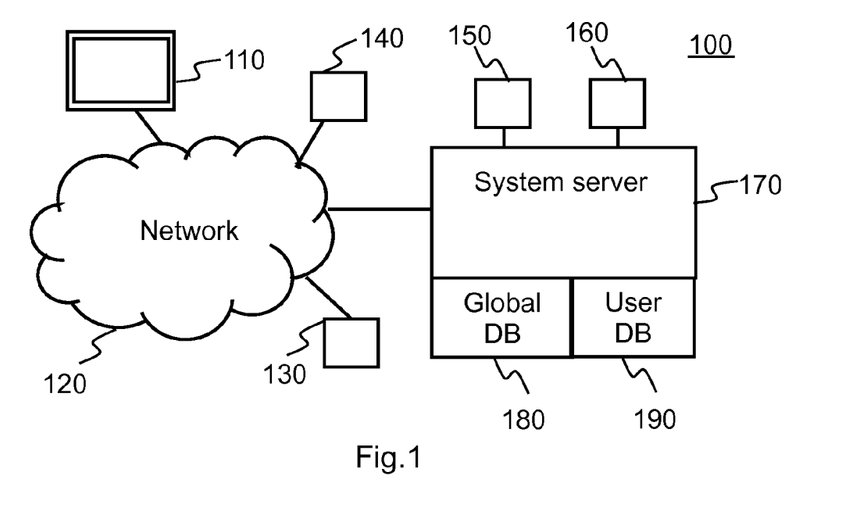
FIG. 1 shows a schematic picture of a dynamic business network and data management service system according to an example embodiment of the present disclosure.

FIG. 1 shows a schematic picture of a dynamic business network and data management service system having data flows between elements in a system according to an example embodiment of the present disclosure. The dynamic business network and data management service system 100 provides dynamic data flows between elements in the system 100. The system 100 includes an apparatus 110, shown as a portable computer for communicating with a user, but could take any appropriate form, such as a cellular telephone handset, personal digital assistant, a personal computer, or a voice-driven communication device.

Apparatus 110 may obtain the information the user needs through network 120 that may be a single network or combination of networks. Apparatus 110 may also generate information. A dynamic business network and data management service system server 170 may also communicate with the network 120 to receive data object requests from apparatus 110 and locate information to return to the apparatus 110. The server 170 may be of any applicable form.

Among other components included in the dynamic business network and data management service system server 170 there may be a global database 180, a user database 190, an index database 150 and a cached information database 160. The global database 180 contains dynamic business network and data management service system related data that is available to all users of the service system 100, for example public data, public timelines, public data entities, public work objects, and collaborators. The user database 190 contains data that is available only to the dedicated user of the service system 100, for example private data, private timelines, private data entities, work objects, collaborators and user profile information. The index database 150 contains data that represent searchable information available to the service system 170. For example, the dynamic business network and data management service system server 170 may scan the internet, intranets, collaboration or co-operation servers or various databases for content such as web sites, service providers, external indexes or workgroup discussions, may extract key words and other objects from the content, and may organize the information in a manner that permits ready searching and retrieval. The index database 150 may also generate other information from the content, such as indicators of how certain web sites link to other web sites, and other related metadata. Dynamic business network and data management service system data, such as data entities generated by context centric applications may also be transferred between the databases 180, 190. For example, a user having copy rights may copy a data entity from the global database 180 to the user database 190.

In an example embodiment of the present disclosure, the cached information database 160 contains copies or substantial copies of content that the service system 170 locates. In this manner, a user who accesses system 170 may request the cached information rather than making direct connection with the content provider, such as when the content provider is inaccessible, has changed the content since it was cached, or when the connection to the content provided is substantially slower than that to the dynamic service system 170. Service system 170 may also be used to provide partial or subsets of information or combinations of information that may be preferable, in some cases, to full web content directly from source systems.

In an example embodiment, history data of the dynamic business network and data management service system may be stored to the cached information database 160.

The dynamic business network and data management service system 100 may also include other nodes 130, 140 connected to the network 120. These nodes 130, 140 could include any sort of device or devices capable of communicating with or over the network 120. For example, node 130 could be a user apparatus monitoring a co-operation project status between two companies, for example by monitoring a data entity generated by a context centric application, such as development plan information generated by a development application and defined by the user of device 110. Node 130 may also be a web server that is capable of delivering content in response to requests by users, such as a user of device 110, or deliver content automatically based on a variety of attributes and variables. As another example, node 140 could be an external service provider that may be accessed by the device 110 or the dynamic service server 170.

Requests for data entities can be initiated by either apparatus 110 or by dynamic service system server 170. Although the request passes through network 120 (and other components that are not pictured), it is directed at service system server 170. Service system server 170 then receives the dynamic request and applies it to a dynamic process, such as by parsing the request, locating available content in databases 150, 160, 180, 190 that contains available responses for the request. The service system server 170 may then transmit dynamic requests to respondents 130, 140 relating to dynamic objects without available responses, receive responses from the respondents 130, 140, organize the dynamic information to a report or a response in the dynamic service system 170, as defined by the requesting user 110, and transmit the report or the response, or indication of it, to designated users 110 through network 120 as a service result. For example, the returned information may also be transcoded to appropriate format for processing in the apparatus 110, such as HTML code, XML messages, WAP code, java applets, JavaScript object notations (JSONs), xhtml, plain text, voiceXML, VoxML, VXML or such.

Figure 2:
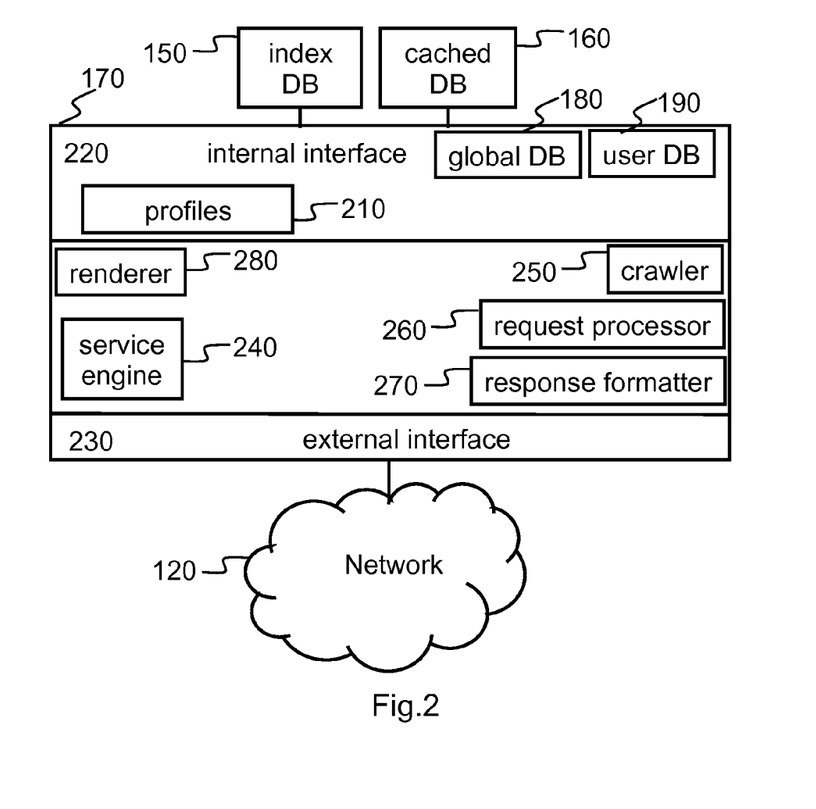
FIG. 2 shows a schematic diagram of a dynamic business network and data management service system server according to an example embodiment of the present disclosure.

FIG. 2 shows a schematic diagram of a dynamic business network and data management service system server 170 providing dynamic data objects or data entities according to an example embodiment of the present disclosure. The service system server 170 may receive and/or requests, generate responses to the requests, and generate data entities based on certain criteria, for example different profile information, data, algorithms and such. The service system server 170 is connected to a network 120, such as the internet, to be able to communicate with users who may be interested in accessing the services provided by dynamic the service system server 170. The dynamic service system server 170 may be broken into multiple separate systems to allow for scalability, and may be connected to network 120 in any of a variety of ways, as is commonly known.

The service system server 170 may include a global database 180 and a user database 190. Furthermore the service system server 170 may also include an index database 150 and a cached information database 160. These databases 150, 160, 180, 190 may be connected to service system server 170, for example, by a high bandwidth LAN or WAN, or could also be connected to the search system server 170 through network 120. The databases may also be located in the same location as the server 170 or split up so that they are located in multiple locations.

The system server 170 may communicate through an internal interface 220 and an external interface 230, which are shown as distinct interfaces, but may be partially or fully combined, or may be represented by additional interfaces. For example, internal interface 220 may comprise interface devices for a high speed, high bandwidth network such as SONET, Infiniband, or Ethernet network cards, or any appropriate communication hardware operating under an appropriate protocol, so that dynamic service system server 170 can respond to a large number of distinct dynamic requests simultaneously. External interface 230 may comprise interface devices for communicating with network 120, such as Ethernet network interface cards (NICs) or other communications devices. The precise design of the service system server 170 could take any appropriate form.

Within the service system server 170, a service engine 240 operates to produce dynamic service results in response to dynamic service requests, input or feedback from users, employing information stored in databases 150, 160, 180, 190. The information in index database 150 may be gathered by a crawler 250, which may continuously or almost continuously obtain new information from sources connected to network 120. A renderer 280 may be included in the service system server 170 for rendering data object related information according to system specific format. Rendering may be done also in the crawler 250, in the service engine 240 or in the external interface 230. Service requests of the dynamic business network and data management service system may be received through the external interface 230 and handled by the request processor 260. For example, request processor 260 may parse the requests and reformat them, for example from html/text requests to internally usable search terms/strings. The dynamic information, such as data entities generated by context centric applications generated by the service engine 240 in response to a request may also be converted by response formatter 270 in a manner that allows it to be used by the requesting device, such as in a WAP format, HTML document, XML document or VoiceML result, and then transmitted via external interface 230.

Dynamic business network and data management service information may be retrieved and/or generated by the service engine 240, which may monitor requests from a user, responses to the user or any number of requests and responses not exclusively related to a particular user. To clarify, these requests and responses may be generated by internal or external systems and services. In this manner, the service engine 240 is able to begin working as soon as a request is received or a response is delivered, either from a user of the system, or from other system components or external systems. For example, where a dynamic business network and data management service request is received by the service system 170, that request may be processed and forwarded to service engine 240. In addition, the service engine 240 may recognize the request, and cause additional formatted requests to be forwarded to the service engine. The service engine 240 may cause the dynamic business network and data management service information that results from those requests to be transmitted to the user's apparatus or external services, for example, using response formatter 270.

The service engine 240 may include, for example, context centric applications, algorithms, service parameters, data entities and dynamic service engine. The service parameters may include parameters that may be selected and changed to manage the manner in which dynamic service information is gathered. The rules may be specific to particular users or accounts (e.g., in a profile of rules for the user, or with pointers for a user to particular parameters to minimize storage space required).

The dynamic business network and data management service system server 170 may continually learn from users and it is possible to build a dedicated index, for example a content matching engine, based on the data passing through the system. Such index may be located in the index database 150. It is also possible to use any available public or proprietary index, for example but not limited to, an openly available index on the internet or a corporate database within a corporate intranet.

In one embodiment of the present disclosure the dynamic profile information may contain several types of attributes. Profile information for the users may be located in system storage block 210 of FIG. 2. Profile information may also be located in the user database 190 or in the global database 180.

Profiles 210 may also connect to other users and systems, including both internal and external users and systems. Profiles and filters may be adapted and applied to external systems, partially or wholly, and external profile information and/or filter information may be adapted and applied, either partially or wholly, to internal profiles and filters.

Typically, an account within the system is defined for a company and certain users within that particular company may use the account.

In an embodiment, pattern data is defined by the service system data mining based on the co-operation and networking data processed by the system.

Data mining of the co-operation and networking data may be used for various internal activities of an organization using the tool. Furthermore, pattern data mining may be used for various external activities of an organization, such as retail, financial, communication, and marketing. It enables to determine relationships among "internal" factors such as price, timing, product positioning, or staff skills, and "external" factors such as economic indicators, competition, and customer demographics. And, it enables them to determine the impact on sales, customer satisfaction, and corporate profits. Finally, it enables them to "drill down" into summary information to view detail transactional data.

In an embodiment, dynamic business network and data management service system may store all data entities related to the context centric applications and perform pattern data mining. Thus, certain patterns may be detected in organizational, project or data entity level, as well as company, group or certain location level, for example.

While large-scale information technology has been evolving separate transaction and analytical systems, data mining provides the link between the two. Data mining software analyzes relationships and patterns in stored transaction data based on open-ended user queries. Several types of analytical software may be used in the dynamic business network and data management service system: statistical, machine learning, and neural networks. Furthermore, different relationships for pattern data may exist.

In an example embodiment of the present disclosure, the service system described in FIGS. 1 to 2 may be applied to various purposes, for example enterprise dynamic co-operation data management, networking between companies, cross-company co-operation data management or personal dynamic data management.

In enterprise data management, the dynamic service system may provide any dynamic service based on company and/or employee needs, for example project management, sourcing, product development, manufacturing, billing and auditing. User profile information may be applied to enterprise usage. There are vast amount of information contained in corporate intranets, corporate database systems and related systems. For example in customer relationship management tools, human resources tools, project management tools, requirements management tools, enterprise resource planning tools, product data management tools, communications tools, recruitment tools, marketing tools, strategic planning tools, financial tools and additionally in relevant external data sources. However, this information is often under-utilized as companies, and their employees face difficulties in providing and/or discovering and/or sharing the most relevant and beneficial data entities in a timely manner. The ability to increase the efficiency and/or enjoyment of this represents a significant opportunity to increase productivity and competitiveness in enterprises. Based on the co-operation data, organization forecasts may be made, for example. Pattern data mining may enable to provide probabilities of outcomes of ongoing projects with certain collaborators, for example.

Figure 3:
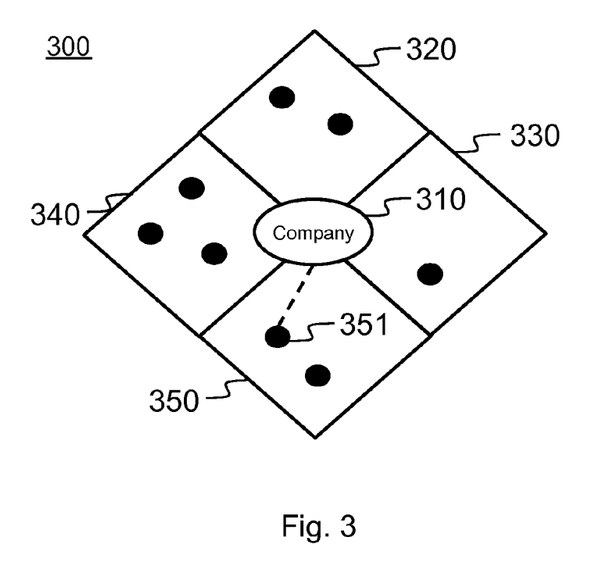
FIG. 3 shows a schematic diagram of a company network structure of a business network and data management service system.

FIG. 3 shows a schematic diagram of a company network structure 300 of a dynamic business network and data management service system.

In the dynamic business network and data management service system, a company 310 is in a center of its own network 320-350. The network structure 300 may comprise a plurality of network segments 320-350 and each segment 320-350 may comprise a plurality of companies or organizations 351.

In an embodiment, a segment 320 may represent customers comprising customer companies or organizations the company 310 has a business relationship. In FIG. 3 the customers are illustrated as two black dots in the segment 320.

In an embodiment, a segment 330 may represent internal relations comprising companies or organizations of the same group as the company 310. In FIG. 3 a company or organization of the internal relation illustrated as a black dot in the segment 330.

In an embodiment, an account for a co-operation organization for accessing the dynamic network management service system may comprise a group of sub-accounts, the sub-accounts reflecting companies belonging to same group represented by a group account. Thus a group account may reflect a business group or a corporation of a plurality of companies. A sub-account may reflect a single company within the group. All companies belonging to the same group may be regarded as belonging to the same segment 330 in internal relations.

A group account (administrator for the business group) invites other accounts (administrators for companies belonging to the business group) to being a part of a group hosted by the group account and the invited accounts being as sub-accounts to this group account. Group account may have at least one administrator user having privileges to invite, delete and reject companies for a group. Correspondingly, group account may have a plurality of users that may define group views, data entities or information processing within the server concerning different combinations of companies within the same group.

Account hierarchy may be dynamic and non-hierarchical compared to tree-like organization structure. A group account may select sub-accounts belonging to the same group and also to separate the sub-accounts from the group. Thus, merging of companies to the same group is easy and also spinning out sub-accounts as a new group is possible without a need to start all over again. Dynamic maintenance of all information in the system by updating the account structure is enabled.

Then, referring to FIG. 3, the segment 330 represents internal relations comprising companies or organizations of the same group as the company 310.

In an embodiment, a segment 340 may represent other organizations comprising companies or organizations the company 310 has a business relationship. In FIG. 3 the organizations are illustrated as three black dots in the segment 340.

In an embodiment, a segment 350 may represent suppliers comprising companies or organizations the company 310 has a business relationship. In FIG. 3 the suppliers are illustrated as two black dots in the segment 350. A dashed line illustrates a business relationship between the company 310 and a supplier company 351.

Figure 4:
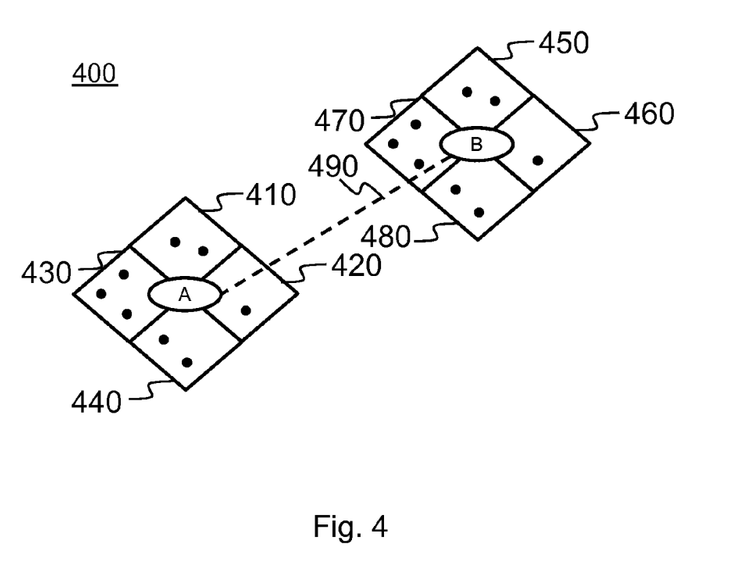
FIG. 4 shows a schematic diagram of a business relationship in a company network structure of a business network and data management service system.

FIG. 4 shows a schematic diagram of a business relationship in a company network structure 400 of a business network and data management service system.

In an embodiment, a company A may comprise a company network 410-440 corresponding to FIG. 3 segments and companies or organizations within the segments 410-440. Similarly, a company B may comprise a company network 450-480 corresponding to FIG. 3 segments and companies or organizations within the segments 450-480. The companies A and B may have a business relationship 490 and still both companies A and B are in center of their own network. For example, company A may be a supplier in company B's network 480 and company B may be a customer in company A's network 410.

Figure 5:
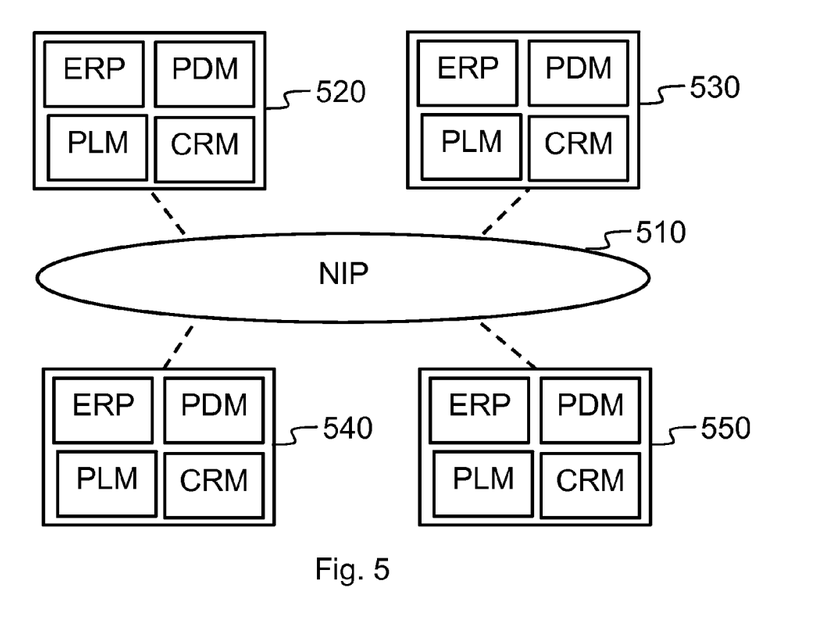
FIG. 5 shows an example block diagram of a network level information platform of a dynamic business network and data management service system according to an example embodiment of the present disclosure.

FIG. 5 shows an example block diagram of a network level information platform (NIP) of a dynamic business network and data management service system according to an example embodiment of the present disclosure.

The network level information platform (NIP) 510 of a dynamic business network and data management service system enables transparent sharing of information within the business network efficiently and reliably. The network level information platform (NIP) 510 may comprise co-operation information of a particular company, such as the company 310 of FIG. 3 or company A or B in FIG. 4.

In an embodiment, the network level information platform (NIP) 510 of a company comprises information from a plurality of companies or organizations 520-550 that the company has a business relationship with. The companies 520-530 may be customer companies, and the companies 540-550 may be supplier companies, for example.

The platform 510 enables flexible arranging and providing of information. A single company 520-550, for example, may belong to a plurality of networks where in one network the company may be a supplier and in another network a customer, and so on.

Each company 520-550 may have internal information systems, such as Enterprise Resource Planning system (ERP), Product Data Management system (PDM), Product Lifecycle Management system (PLM) and Customer Relationship Management system (CRM).

The network level information platform (NIP) 510 does not need to replace all the existing systems but to provide information sharing for co-operation partners in company business relationship network. The existing systems in the companies 520-550 may still be used for creating and storing some information.

In an embodiment the co-operation information may be provided to the network level information platform (NIP) 510 from the business relationship companies 520-550 and their internal information systems, such as Enterprise Resource Planning system (ERP), Product Data Management system (PDM), Product Lifecycle Management system (PLM) and Customer Relationship Management system (CRM) using various methods. The information may be provided manually, directly integrating a system to the platform 510, by using electronic data interchange (EDI) or by defining application programming interface (API), for example.

Figure 6:
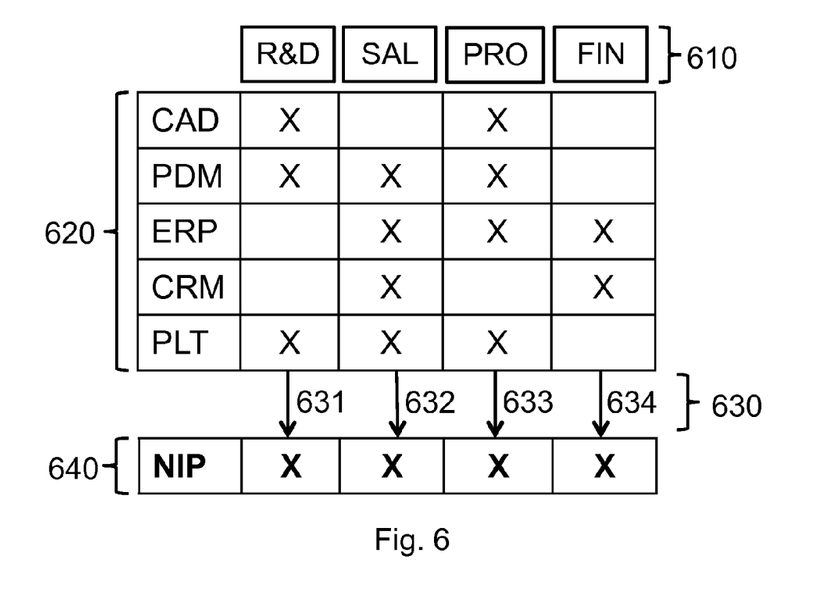
FIG. 6 illustrates functionality of information management in a dynamic business network and data management service system according to an example embodiment of the invention.

FIG. 6 illustrates functionality of information management in a dynamic business network and data management service system according to an example embodiment of the invention.

A company or organization using a dynamic business network and data management service system typically comprises a plurality of functionalities or departments 610, such as research and development (R&D), sales (SAL), production (PRO) and finance (FIN), for example. Furthermore, a plurality of different information management systems 620 are used within the company, such as Computer Aided Design system (CAD), Product Data Management system (PDM), Enterprise Resource Planning system (ERP), Customer Relationship Management system (CRM) and development platforms (PLT).

In an embodiment, an account for a co-operation organization for accessing the dynamic business network and data network management service system is defined. The company account is used for accessing the system. At least one co-operation organization comprising at least one co-operation relation may be defined, wherein the co-operation relation being associated with at least two accounts, such as company A and company B of FIG. 4. Business relationship information may be defined 630 based on the co-operation relation. Each company may dynamically select systems 620 for business relationship information, as illustrated by "X" in FIG. 6. Definitions 630 for the business relationship information may be dynamically adjusted according to the company account access rights.

The defined business relationship information 630 may comprise research and development (R&D) business relationship information 631 comprising, for example, at least one of the following:
  product figures;
  memos;
  engineering change notifications;
  development ideas; and
  R&D project data.

The defined business relationship information 630 may comprise sales (SAL) business relationship information 632 comprising, for example, at least one of the following:
  requests for offers;
  offers;
  orders;
  order confirmations;
  forecasts; and
  supply chain development data.

The defined business relationship information 630 may comprise production (PRO) business relationship information 633 comprising, for example, at least one of the following:
  product figures;
  material certificates;
  product manuals; and
  instructions.

The defined business relationship information 630 may comprise financial (FIN) business relationship information 634 comprising, for example, at least one of the following:
  invoices to customers; and
  invoices from suppliers.

The above mentioned are examples of company functionalities or departments (610 in FIG. 6.) and they may include other typical functions like engineering, quality, marketing, sourcing & procurement, supply chain development, projects, inbound & outbound logistics, aftersales, services, IT, management and human resource management.

The business relationship information 630 is maintained in a system server (NIP), wherein the business relationship information comprising inbound information and outbound information associated to the at least two accounts. Furthermore, a set of context centric applications is provided that are accessible for the at least two accounts over a network and configured to operate on the business relationship information 630 associated to the at least two accounts, wherein each context centric application configured to generate at least one data entity 640; and dynamically sharing the at least one data entity 640 using at least one context centric application for the at least two accounts.

Figure 7:
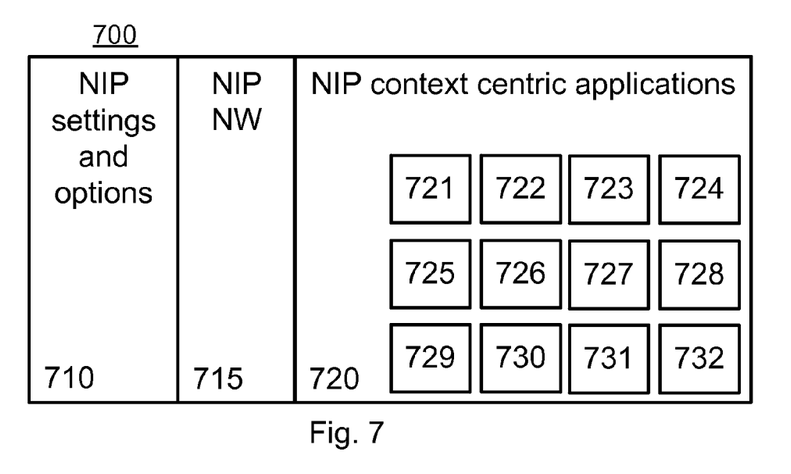
FIG. 7 shows a schematic view of a user interface of a dynamic business network and data management service system according to an example embodiment of the present disclosure.

FIG. 7 shows a schematic view 700 of a user interface of a dynamic business network and data management service system according to an example embodiment of the present disclosure. The user interface may comprise network level information platform (NIP) features, such as network level information platform (NIP) settings and options area 710, network level information platform (NIP) network management area (NIP NW) 715 and network level information platform (NIP) context centric applications area 720. The settings and options area 710 may comprise account information, access options, search functionalities and shortcuts. The areas 710, 715, 720 may be located in any part of the user interface 700.

The network management area 715 comprises information of co-operation organizations, co-operation relations and groups of sub-accounts.

The context centric applications area 720 comprises a plurality of context centric applications 721-732 that can be activated by touching on a touch sensitive display or using a pointing device on a graphical user interface, for example.

The context centric applications 721-732 may comprise, but are not limited to, applications relating to:
- tasks;
- projects;
- engineering changes
- services;
- market place;
- forecasts;
- key performance indicators;
- bulletins;
- ideas;
- development;
- library;
- audits;
- contracts;
- offer requests;
- offers;
- orders; and
- claims.

In an embodiment, when selecting an application of a set of context centric applications 721-732, a list of available data entities may be provided. Based on company account access rights the user is enabled to operate on the business relationship information associated to the accounts of the company business relationships. Each context centric application 721-732 is configured to generate at least one data entity. Generating at least one data entity comprises generating a new data entity or amending an existing data entity. Furthermore, the context centric application 721-732 may be configured to delete at least one data entity. All business relationship information 630, 640 maintained in the system server as illustrated in FIG. 6 are available to the context centric applications 721-732. The generated data entity may be made dynamically available using at least one context centric application for any other company account of the business network.

Figure 8:
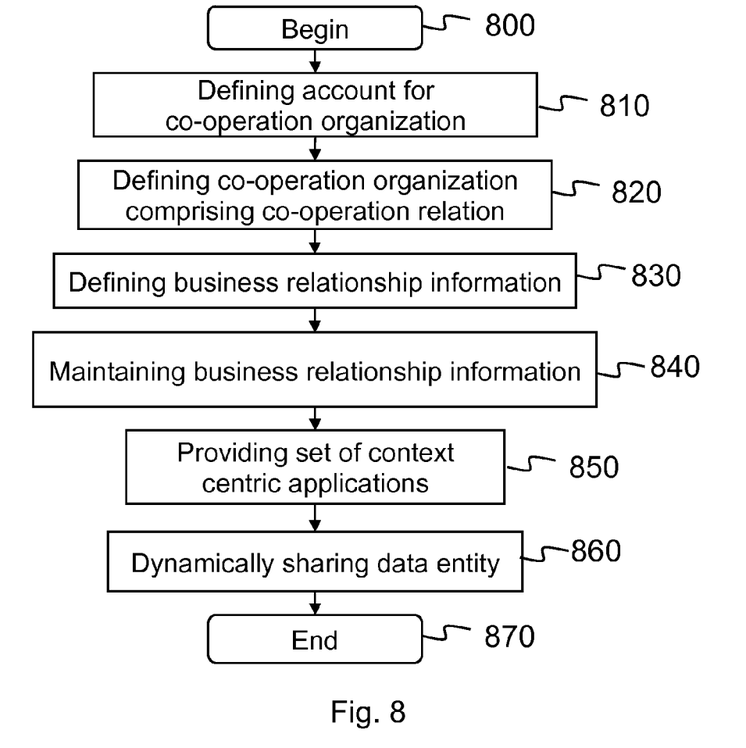
FIG. 8 shows another flow chart of exemplary method steps for providing a dynamic business network and data management service system.

FIG. 8 shows another flow chart of exemplary method steps for providing a dynamic business network and data management service system. The method begins at step 800. In step 810, an account for a co-operation organization for accessing the dynamic business network and data network management service system is defined. In step 820, at least one co-operation organization comprising at least one co-operation relation is defined, wherein the co-operation relation being associated with at least two accounts. In step 830, business relationship information is defined based on the co-operation relation. In step 840, the business relationship information is maintained in a system server, wherein the business relationship information comprising inbound information and outbound information associated to the at least two accounts. In step 850, a set of context centric applications is provided accessible for the at least two accounts over a network and configured to operate on the business relationship information associated to the at least two accounts, wherein each context centric application configured to generate at least one data entity. In step 860, the at least one data entity is dynamically shared using at least one context centric application for the at least two accounts. In step 870, the method ends.

The above mentioned flow chart is exemplary and the steps 830-860 may take other order depending of the use of the system. For example, business relationship information is defined in step 830 (e.g. customer and multiple suppliers agree on a common project which will be managed trough the system), a set of context centric applications are chosen in step 850 (e.g. projects), the data entity is shared dynamically in step 860 (e.g. data entity is this project and it is shared between customer and multiple suppliers) and this business relationship information is maintained in the system in step 840 (e.g. this project is maintained in this system where all the parties can access and edit the information). Furthermore it is possible that not all steps realizes in the process (e.g. information is not shared even though it is added to the system).

In an embodiment, steps 800-870 may be arranged in different order depending on the implementation. For example steps 830, 840, and 850 may change place with each other.

Figure 9:
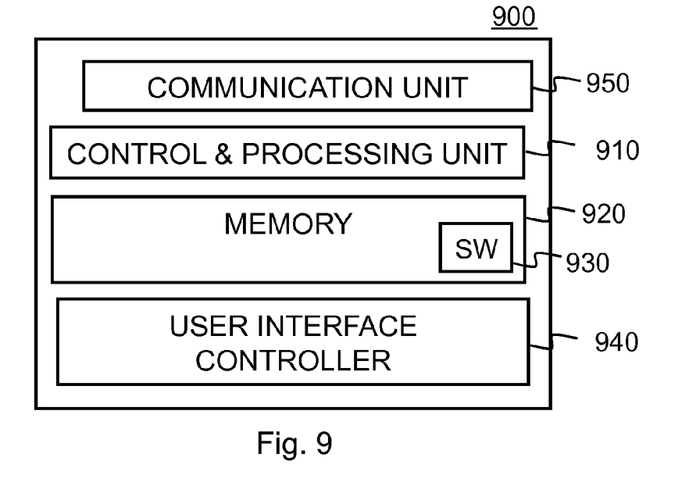
FIG. 9 shows an example block diagram of an apparatus in which various embodiments of the present disclosure may be applied.

FIG. 9 presents an example block diagram of an apparatus 900 in which various embodiments of the present disclosure may be applied. This may be a user device or apparatus, such as a laptop, a desktop, a mobile terminal or other communication device.

The general structure of the apparatus 900 comprises a communication interface module 950, a processor 910 coupled to the communication interface module 950, and a memory 920 coupled to the processor 910. The apparatus further comprises software 930 stored in the memory 920 and operable to be loaded into and executed in the processor 910. The software 930 may comprise one or more software modules and can be in the form of a computer program product. The apparatus 900 further comprises a user interface controller 940 coupled to the processor 910.

The communication interface module 950 implements at least part of the user data communication discussed in connection with various embodiments of the present disclosure. The communication interface module 950 may be a wired broadband interface module such as LAN or WAN. The communication interface module 950 may also be, e.g., a radio interface module, such as a WLAN, Bluetooth, GSM/GPRS, CDMA, WCDMA, or LTE (Long Term Evolution) radio module. The communication interface module 950 may be integrated into the apparatus 900 or into an adapter, card or the like that may be inserted into a suitable slot or port of the apparatus 900. The communication interface module 950 may support one radio interface technology or a plurality of technologies. FIG. 9 shows one communication interface module 950, but the apparatus 900 may comprise a plurality of communication interface modules 950.

The processor 910 may be, e.g., a central processing unit (CPU), a microprocessor, a digital signal processor (DSP), a graphics processing unit, or the like. FIG. 9 shows one processor 910, but the apparatus 900 may comprise a plurality of processors.

The memory 920 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 900 may comprise a plurality of memories. The memory 920 may be constructed as a part of the apparatus 900 or it may be inserted into a slot, port, or the like of the apparatus 900 by a user. The memory 920 may serve the sole purpose of storing data, or it may be constructed as a part of an apparatus serving other purposes, such as processing data.

The user interface controller 940 may comprise circuitry for receiving input from a user of the apparatus 900, e.g., via a keyboard, graphical user interface shown on the display of the apparatus 900, speech recognition circuitry, or an accessory device, such as a headset, and for providing output to the user via, e.g., a graphical user interface or a loudspeaker.

A skilled person appreciates that in addition to the elements shown in FIG. 9, the apparatus 900 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 900 may comprise a disposable or rechargeable battery (not shown) for powering the apparatus 900 when external power if external power supply is not available.

Figure 10:
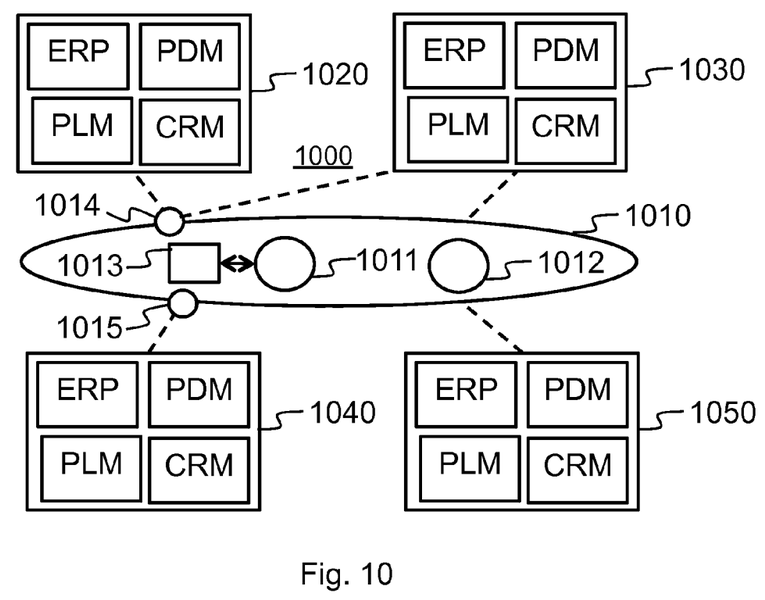
FIG. 10 shows an example block diagram of a network level information platform (NIP) of a dynamic business network and data management service system according to an example embodiment of the present disclosure.

FIG. 10 shows an example block diagram of a network level information platform (NIP) 1010 of a dynamic business network and data management service system 1000 according to an example embodiment of the present disclosure.

The network level information platform (NIP) 1010 of a dynamic business network and data management service system 1000 enables transparent and dynamic sharing of information within the business network efficiently and reliably. The network level information platform (NIP) 1010 may comprise co-operation information of a particular company, such as the company 310 of FIG. 3 or company A or B in FIG. 4.

In an embodiment, the network level information platform (NIP) 1010 of a company comprises information from a plurality of companies or organizations 1020-1050 that the company has a business relationship with. The companies 1020-1030 may be customer companies, and the companies 1040-1050 may be supplier companies, for example.

Each company 1020-1050 may have internal information systems, such as Enterprise Resource Planning system (ERP), Product Data Management system (PDM), Product Lifecycle Management system (PLM) and Customer Relationship Management system (CRM).

The network level information platform (NIP) 1010 does not need to replace all the existing systems but to provide information sharing for co-operation partners in company business relationship network. The existing systems in the companies 1020-1050 may still be used for creating and storing some information.

In an embodiment the co-operation information may be provided to the network level information platform (NIP) 1010 from the business relationship companies 1020-1050 and their internal information systems, such as Enterprise Resource Planning system (ERP), Product Data Management system (PDM), Product Lifecycle Management system (PLM) and Customer Relationship Management system (CRM) using various methods. The information may be provided manually, directly integrating a system to the platform 1010, by using electronic data interchange (EDI) or by defining application programming interface (API), for example.

In an embodiment, a plurality of context centric applications 1011-1012 are provided by the network level information platform (NIP) 1010 of a dynamic business network and data management service system over a network and configured to operate on business relationship information associated to at least two accounts of companies 1020-1050, wherein each context centric application 1011-1012 is configured to generate at least one data entity 1013 and dynamically sharing the at least one data entity 1013 using at least one context centric application 1011-1012 for the at least two accounts.

The dynamic business network and data management service system 1000 is a non-hierarchical system for companies to share and manage information dynamically in their business relationships. In the system 1000, a company is a basic unit and information is shared and owned by the companies 1020-1050, not by individual persons. Within the system, each personal account, if any, and profile is assigned to a company account. Business relationships are the key elements in sharing information. Shared information is related to a specific business relationship, not internally to a specific company. When persons leave companies, the information remains creating a history for business relationship. Furthermore, the system 1000 is a non-hierarchical system enabling dynamic information sharing. Every company 1020-1050 is the center of its own partner network. Traditionally a supplier might use or have an access to customers' own it-system. There might have been several same kinds of connections or accesses. In the present system 1000, the system is not customers' own but the supplier can use the same systems with multiple customers and own suppliers. The system 1000 is meant for business network management and dynamic information sharing. Every company 1020-1050 manages the portfolio of information whether the information is shared by them or to them. The information is managed through applications 1011-1012 that are based on industry specific cross-company processes (orders, claims, audits, ideas, projects, etc.)

In an embodiment, an account is defined. At least one co-operation organization is defined comprising at least one co-operation relation (e.g. customer company 310 of FIG. 3 (or 1020 in FIG. 10) establishes an online business relationship with a supplier company 351 of FIG. 3 (or 1040 in FIG. 10)), wherein the co-operation relation being associated with at least two accounts. Business relationship information (e.g. data entities 1013 like common development actions, contracts, ideas, offers, orders, claims etc.) is defined based on the co-operation relation. The business relationship information is maintained in a system server, wherein the business relationship information comprising inbound information (e.g. data entities 1013 like single contract, idea, claim etc. created by supplier company 1040 (351 in FIG. 3) and shared to customer company 1020 (310 in FIG. 3)) and outbound information (e.g. data entities 1013 like single contract, idea, claim etc. created by customer company 1020 (310 in FIG. 3) and shared to supplier company 1040 (351 in FIG. 3)) associated to the at least two accounts. A set of context centric applications may be provided (e.g. contracts, ideas, claims 1011-1012 in FIG. 10)) accessible for the at least two accounts over a network and configured to operate on the business relationship information associated to the at least two accounts, wherein each context centric application configured to generate at least one data entity (e.g. a single contract, idea, claim 1013 in FIG. 10).

A company 1020-1050 can use the same system 1000 with all partner companies whether they are vertically in a same supply chain or in co-operation horizontally with companies or any other organizations. By using the platform 1010 the connections between companies 1020-1050 can be created by establishing online business relationships. In these relationships the information can be shared dynamically between one ore multiple companies 1020-1050 in non-hierarchical way (with any amount and any type of partner companies, whether they are customers, suppliers, units from same group or any other organizations). Thus, the system 1000 provides fast and transparent industrial information sharing to business relationships and faster, more user-friendly and more efficient way to execute cross-company cooperation.

Furthermore, group functionality provides a unique way to manage information within a specific business group comprised of one or more group accounts (different levels of the group organization) and sub-accounts (different group units like factories in different locations/countries under the same group). In FIG. 10 this could mean that the group company 1020 (group account) can create internal relations with group units 1030-1050 (sub-accounts) and invite them to the same group hosted by the group account. In this way the users of the group account gain access to data entities 1013 shared in these sub-accounts. And example could include group units (e.g. factories) in U.S., Canada and Mexico (sub-accounts 1030-1050) and one group account 1020. The users of sub-accounts 1030, 1040 or 1050 can see only the data entities 1013 (e.g. orders) shared to the according sub-account 1030, 1040 or 1050. The users of group account 1020 (typically c-level executives) can see all the data entities 1013 shared to these three sub-accounts 1030-1050. For an example if these group units (factories) have different kind of internal ERP (Enterprise Resource Planning) systems, this could create one view to all the orders made in these different ERP systems by group units (sub-accounts) and shared via this dynamic business network and data management service system regardless what ERP systems are used.

In an embodiment, the network level information platform (NIP) 1010 may comprise application programming interface (API) 1014-1015. For example, an order from an ERP system of a customer 1020 may be sent automatically via the API 1014 to the network level information platform (NIP) 1010. Supplier's 1040 ERP system receives notification of the order and may automatically fetch the order via API 1015. Furthermore, order confirmation from the supplier 1040 ERP may be sent automatically via the API 1015 to the platform 1010 and delivered via the API 1014 to the customer 1020 ERP.

In an embodiment, an order from an ERP system of a customer 1020 may be sent automatically via the API 1014 to the network level information platform (NIP) 1010. Supplier's 1030 ERP system receives notification of the order and may automatically fetch the order via API 1014. Furthermore, order confirmation from the supplier 1030 ERP may be sent automatically via the API 1014 to the platform 1010 and delivered via the API 1014 to the customer 1020 ERP. Thus, different API 1014, 1015 may be used between customers and suppliers when communicating via the platform 1010.

Various embodiments have been presented. It should be appreciated that in this document, words comprise, include and contain are each used as open-ended expressions with no intended exclusivity.

The foregoing description has provided by way of non-limiting examples of particular implementations and embodiments a full and informative description of the best mode presently contemplated by the inventors for carrying out the present disclosure. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this present disclosure may be used to advantage without the corresponding use of other features. As such, the foregoing description shall be considered as merely illustrative of the principles of the present disclosure, and not in limitation thereof. Hence, the scope of the invention is only restricted by the appended patent claims.

The invention claimed is:

1. A method for providing a dynamic business network and data management service system, the method comprising:
   defining an account for a co-operation organization for accessing the dynamic business network and data network management service system;
   defining at least one co-operation organization comprising at least one co-operation relation, wherein the co-operation relation being associated with at least two accounts;
   defining business relationship information based on the co-operation relation;
   maintaining the business relationship information in a system server, wherein the business relationship information comprising inbound information and outbound information associated to the at least two accounts;
   providing a set of context centric applications accessible for the at least two accounts over a network and configured to operate on the business relationship information associated to the at least two accounts, wherein each context centric application configured to generate at least one data entity; and
   dynamically sharing the at least one data entity using at least one context centric application for the at least two accounts.

2. The method of claim 1, wherein the account comprising at least one of a group account reflecting a business group, and a sub-account reflecting a company belonging to the business group, the method further comprising:
   inviting, by the group account, at least one sub-account to associate the sub-accounts with the group account.

3. The method of claim 2, further comprising:
   dynamically sharing a data entity of a sub-account with the group account, and providing a group view for the group account showing data entities of multiple sub-accounts.

4. The method of claim 1, further comprising:
   dynamically sharing a plurality of data entities for the at least two accounts by providing a list of the data entities.

5. The method of claim 1, further comprising:
   defining access rights for the account, based on which access rights a user of the account is provided access to the dynamic network management service system.

6. The method of claim 5, wherein the access rights for the account defines access rights for data entities accessible for the account using context centric applications.

7. The method of claim 6, further comprising:
   defining, by an account responsible for a data entity, the access rights of another account for the data entity.

8. The method of claim 1, wherein the data entity comprising at least one of the following:
   development action related information;
   suggested idea information;
   claim information;
   bill information;
   task information;
   discussions information;
   schedule information;
   status information;
   reports information;
   order information;
   offer request information;

offer information;
contract information;
project information;
audit information; and
product information.

9. The method of claim 1, further comprising:
providing an access for the account over a web based service to the dynamic business network and data network management service system.

10. The method of claim 9, further comprising:
providing user interaction for the web based service with a browser-based application.

11. An apparatus comprising:
a communication unit configured to provide access to a user device;
a processor;
a memory including computer program code;
the memory and the computer program code configured to, with the processor, cause the apparatus to:
define an account for a co-operation organization for accessing the dynamic business network and data network management service system;
define at least one co-operation organization comprising at least one co-operation relation, wherein the co-operation relation being associated with at least two accounts;
define business relationship information based on the co-operation relation;
maintain the business relationship information in a system server, wherein the business relationship information comprising inbound information and outbound information associated to the at least two accounts;
provide a set of context centric applications accessible for the at least two accounts over a network and configured to operate on the business relationship information associated to the at least two accounts, wherein each context centric application configured to generate at least one data entity; and
dynamically share the at least one data entity using at least one context centric application for the at least two accounts.

12. The apparatus of claim 11, comprising a server apparatus connected via the communication unit to internet and configured to provide access to a plurality of user devices, and the server apparatus further comprising:
a global database;
a user database;
an index database;
a cached information database; wherein
the memory and the computer program code configured to, with the processor, cause the server apparatus to:
provide dynamic business network and data management service system related data, by the global database, available to the plurality of user devices;
provide dedicated user data, by the user database, data that being available only to a dedicated user of users operating the plurality of user devices;
provide searchable information, by the index database, available to a service system; and
provide cached information, by the cached information database, available to the plurality of user devices.

13. The apparatus of claim 12, wherein
the dynamic business network and data management service system related data comprising at least one of the following: public data, public timelines, public data entities, and public work objects; and
the dedicated user data comprising at least one of the following: private user data, private user timelines, private user data entities, user work objects, collaborators and user profile information.

14. The apparatus of claim 12, wherein
the searchable information comprising organized information ready for searching and retrieval by extracting key words; and
the cached information comprising copies of content that the service system locates and makes available to the plurality of user devices.

15. The apparatus of claim 14, wherein history data of the dynamic business network and data management service system is stored to the cached information.

16. The apparatus of claim 12, comprising a network level information platform (NIP).

17. The apparatus of claim 16, wherein the network level information platform (NIP) comprising:
a plurality of context centric applications configured to operate on information associated to at least two accounts of companies, wherein each context centric application is configured to generate at least one data entity and dynamically sharing the at least one data entity using at least one context centric application for the at least two accounts.

18. The apparatus of claim 17, wherein the network level information platform (NIP) further comprising:
an application programming interface (API) for automatically transceiving information relating to at least one data entity.

19. The apparatus of claim 18, wherein the data entity comprising an order from an ERP (Enterprise Resource Planning) system external to the network level information platform (NIP).

20. A computer program embodied on a computer readable medium comprising computer executable program code which, when executed by at least one processor of an apparatus, causes the apparatus to:
define an account for a co-operation organization for accessing the dynamic business network and data network management service system;
define at least one co-operation organization comprising at least one co-operation relation, wherein the co-operation relation being associated with at least two accounts;
define business relationship information based on the co-operation relation;
maintain the business relationship information in a system server, wherein the business relationship information comprising inbound information and outbound information associated to the at least two accounts;
provide a set of context centric applications accessible for the at least two accounts over a network and configured to operate on the business relationship information associated to the at least two accounts, wherein each context centric application configured to generate at least one data entity; and
dynamically share the at least one data entity using at least one context centric application for the at least two accounts.

* * * * *